(12) United States Patent
Troitski

(10) Patent No.: US 6,720,523 B1
(45) Date of Patent: Apr. 13, 2004

(54) METHOD FOR PRODUCTION OF LASER-INDUCED IMAGES REPRESENTED BY INCOMPLETE DATA, WHICH ARE SUPPLEMENTED DURING PRODUCTION

(75) Inventor: Igor Troitski, 853 Arrowhead Trail, Henderson, NV (US) 89015

(73) Assignee: Igor Troitski, Henderson, NV (US)

( * ) Notice: Subject to any disclaimer, the term of this patent is extended or adjusted under 35 U.S.C. 154(b) by 0 days.

(21) Appl. No.: 10/251,740

(22) Filed: Sep. 23, 2002

(51) Int. Cl.$^7$ ............................................... B23K 26/00
(52) U.S. Cl. ................................................. 219/121.69
(58) Field of Search .................. 219/121.6, 121.68, 219/121.69, 121.78, 121.81, 121.82, 121.83, 121.85

(56) References Cited

U.S. PATENT DOCUMENTS

| | | | | |
|---|---|---|---|---|
| 3,715,734 A | * | 2/1973 | Fajans | 340/173 LM |
| 4,092,518 A | * | 5/1978 | Merard | 219/121 LM |
| 5,206,496 A | * | 4/1993 | Clement et al. | 250/271 |
| 5,575,936 A | * | 11/1996 | Goldfarb | 219/121.68 |
| 5,637,244 A | * | 6/1997 | Erokhin | 219/121.69 |
| 5,653,900 A | * | 8/1997 | Clement et al. | 219/121.68 |
| 5,886,318 A | * | 3/1999 | Vasiliev et al. | 219/121.69 |
| 6,087,617 A | * | 7/2000 | Troitski et al. | 219/121.6 |
| 6,333,486 B1 | * | 12/2001 | Troitski | 219/121.69 |
| 6,399,914 B1 | * | 6/2002 | Troitski | 219/121.69 |
| 6,417,485 B1 | * | 7/2002 | Troitski | 219/121.69 |
| 6,426,480 B1 | * | 7/2002 | Troitski | 219/121.69 |
| 6,633,321 B1 | * | 10/2003 | Maurer | 347/224 |

FOREIGN PATENT DOCUMENTS

| | | | |
|---|---|---|---|
| EP | 0743128 A1 | * | 11/1996 |
| RU | 321422 | * | 11/1970 |
| RU | 1838163 | * | 3/1992 |
| RU | 20082288 C1 | * | 2/1994 |
| RU | WO 96/30219 | * | 3/1995 |

OTHER PUBLICATIONS

Troitski, System for creation of laser–induced damage images and problems of their optimization, Proc. of SPIE, vol. 3902 (2000), 489–499.*

Troitski, Experience of creation of laser–induced damage images, Proc. of SPIE, vol. 3902 (2000), 479–488.*

Igor Troitski "Laser–induced damage creates interior images" OE Reports, No 191, Nov. 1999.*

Troitski, "Method and laser system for creating high–resolution laser–induced damage images" Proc. of SPIE, vol. 4679 (2001), 392–399.*

* cited by examiner

*Primary Examiner*—Samuel M. Heinrich

(57) ABSTRACT

The present invention discloses a method for the production of laser-induced images inside transparent material, when complete image information is lacking before production and is supplemented only during production. The method enables to transform both the displayed image represented by incomplete data, and the new image parts added during production into aggregate of laser-induced damages (etch points) so as the high quality laser-induced image can be produced. In particular, the method teaches: how to detach the image parts, about which we do not have information, so as the new parts can be produced within a transparent material after the production of the rest parts without internal split of the material; how to build a contour of the new image part to the corresponding detachment line; how to eliminate of the objectionable visual effect connected with the increase of laser-induced damages density of the detachment area; how to smooth of gray shades along the borders between new image parts and the adjacent areas of the whole images by special aggregate of laser-induced damages; how to agree the new image layers with the layers of the whole image.

9 Claims, 12 Drawing Sheets a)      b)          a)      b)

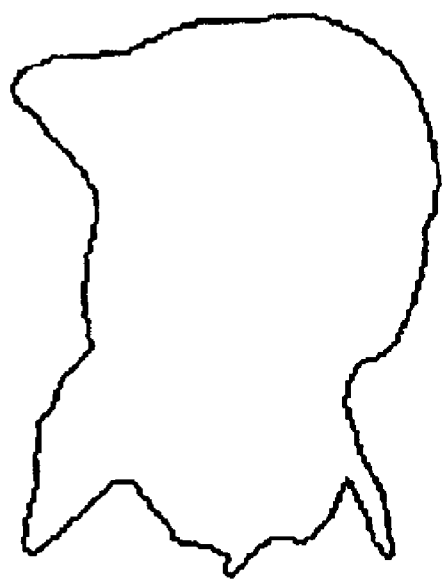
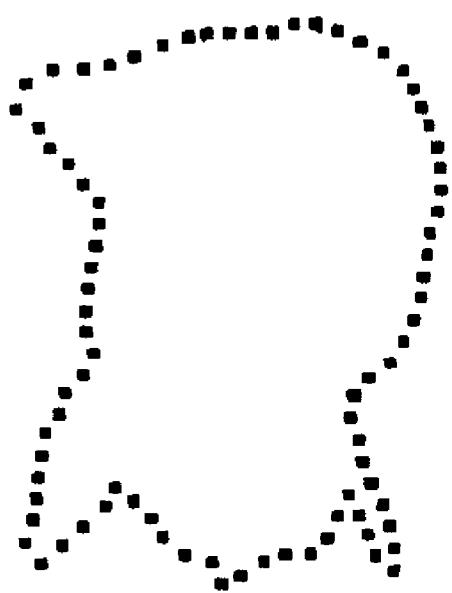
Figure 15    Figure 16
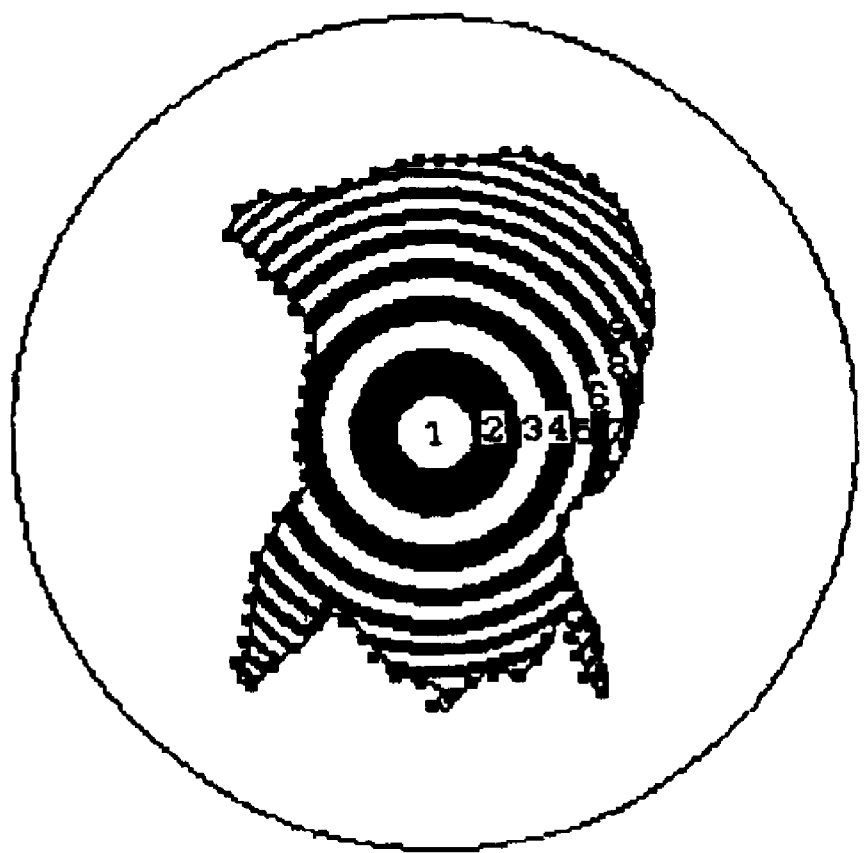
Figure 17

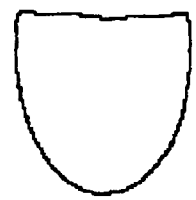
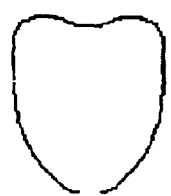
Figure 27　　　　　Figure 28　　　　　Figure 29
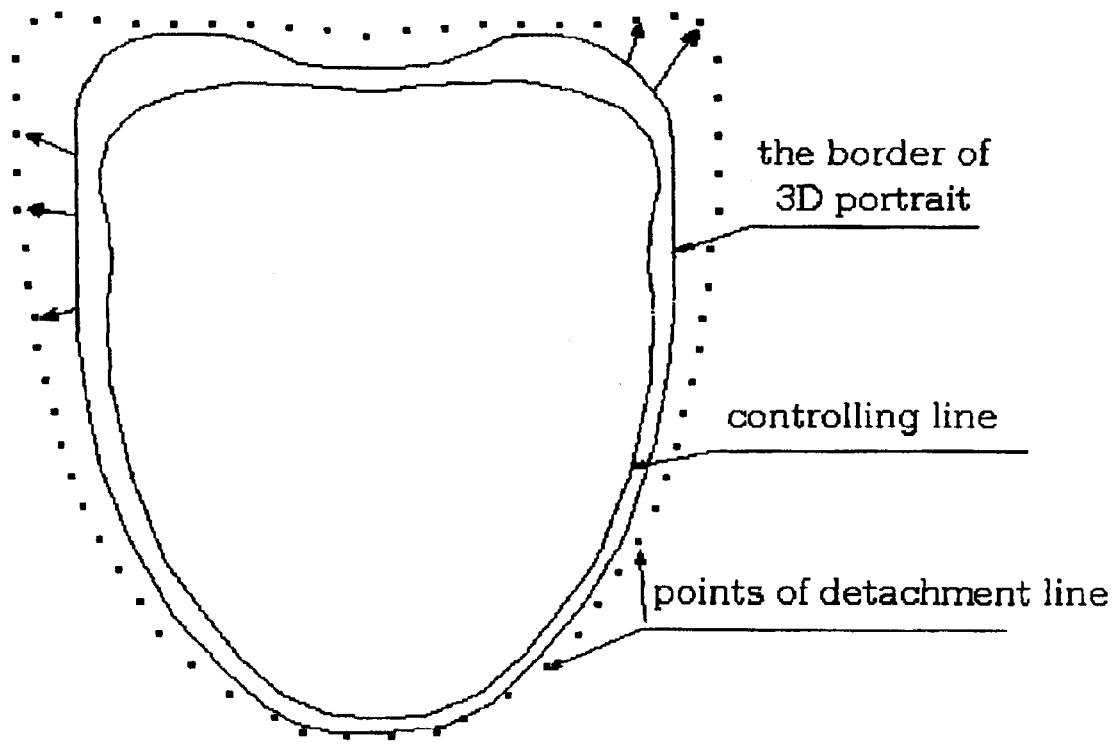
Figure 30

METHOD FOR PRODUCTION OF LASER-INDUCED IMAGES REPRESENTED BY INCOMPLETE DATA, WHICH ARE SUPPLEMENTED DURING PRODUCTION

FIELD OF THE INVENTION

The present invention relates to methods for producing laser-induced images inside three-dimensional transparent media by using pulsed laser radiation.

BACKGROUND OF THE INVENTION

A number of techniques for creating a variety of patterns on the surface and inside of transparent substrates using pulsed laser radiation are well known.

The Russian invention No. 321422 to Agadjanov et. al. discloses a method of manufacturing decorative products inside a transparent material by changing the material structure by laser radiation. As disclosed, by moving a material relative to a focused laser beam, it is possible to create a drawing inside the material.

U.S. Pat. No. 3,715,734 to Fajans discloses a three-dimensional memory storage unit, which is prepared by carbonizing selected spots in a block of polymethyl-methacrylate by means of a steeply converging laser beam. The energy of the beam is applied in pulses of such duration and at such intensity that carbonization takes place only at the focal point of the beam.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He-Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,653,900 to Clement, et al. discloses a method and an apparatus for making a moving body of material. In a preferred embodiment, the apparatus includes at least one movable galvanometer mirror capable of moving the laser beam to create a mark of a predetermined shape.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. Pat. No. 6,333,486 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. Pat. No. 6,417,485 to Troitski discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

U.S. Pat. No. 6,399,914 to Troitski discloses methods and an apparatus for creating high quality laser-induced damage images. One or more embodiments of the invention comprise a method for producing laser-induced damage images inside the special transparent material containing special kinds of impurities, which decrease the damage threshold of the material. Colored laser-induced damage images are produced inside transparent materials containing color impurities. Laser radiation is focused inside the transparent material in such a way that focal area contains at least one said impurity. Other embodiments of the invention comprise a method and a system for producing laser-induced images by using two lasers. The first laser generates radiation, which heats the predetermined material area about a point, where breakdown should be produced, to the vitrify temperature. The second laser generates radiation, which creates breakdown in a point of the heated area after the area is heated to the vitrify temperature.

U.S. Pat. No. 6,426,480 to Troitski discloses the method and laser system for production of high quality single-layer laser-induced damage portraits inside transparent material.

U.S. patent application Ser. No. 10/117,592 to Troitski et al. discloses the method for producing images containing laser-induced color centers and laser-induced damages. These color centers are produced in a result of photoionization generated by laser radiation with energy lower the breakdown threshold.

U.S. patent application Ser. No. 09/354,236 to Troitski discloses the laser-computer graphic system for generating portrait and 3-D sculpture reproductions inside optically transparent material.

U.S. patent application Ser. No. 09/354,236 to Troitski et al discloses the method and laser system for generating laser radiation of specific temporal shape for production of high quality laser-induced damage images.

U.S. patent application Ser. No. 09/679,201 to Troitski discloses the method and laser system for production of high-resolution laser-induced images inside transparent materials by generating small etch points.

U.S. patent application Ser. No. 10/016,013 to Troitski discloses the method for production of laser-induced damage images with special characteristics by creating damages of special space shape.

U.S. patent application Ser. No. 09/354,236 to Troitski et al. discloses the method creating damage arrangement for production of 3D laser-induced damage portraits inside transparent materials.

U.S. patent application Ser. No 29/164,228 to Troitski shows the ornamental design for transparent material inside of which a 2D laser-induced damage portrait is placed.

U.S. patent application Ser. No 29/165,478 to Troitski and Cashman shows the ornamental design for transparent material inside of which a 2D laser-induced damage portrait is placed on a spherical surface.

The publication "System for creation of laser-induced damage images and problems of their optimization" (I. N. Troitski, Proc. of SPIE Vol. 3902 (2000), 489–499) describes methods for generating 3D images and portraits allowing reproduction of them within an optically transparent material with the same resolution like computer images, without sharp point structure and without significant fluctuation of gray shades.

The publication "Experience of creation of laser-induced damage images" (I. N. Troitski, Proc. of SPIE Vol. 3902 (2000), 479–488) discloses the specific system for production of laser-induced damage images.

The publication "Image recording by laser-induced damages" (I. N. Troitski, Optical Memory and Neural Networks, Vol. 9, No. 4, (2000) 233–238) discusses the problems of laser-induced damage utilization for image recording.

The publication "Method and laser system for creating high-resolution laser-induced damage images" (I. N. Troitski, Proc. of SPIE Vol. 4679 (2002), 392–399) describes creation of small laser-induced damages without large star structure by the specific temporal radiation.

As it is possible to conclude from the review of Patents and scientific publications, the laser-induced image technology combines progress in the fields of:

the interaction of power laser radiation with transparent material, the laser engineering and the computer graphic art.

New researches of the interaction of power laser radiation with transparent material give the information for development of methods for creating etch points with special characteristics, letting to produce high quality laser-induced images. Evolution of the laser engineering gives a chance to realize the methods and create modern, high-speed production laser systems. The progress in the computer graphic art enables to develop new methods for processing and transformation of displayed images into the form suitable for image production inside three-dimensional transparent media Although these fields are very different, the production of laser-induced images demands to take into account results of each field. So it is impossible to transfer displayed image into aggregate of etch points without taking into account peculiar properties of the interaction of power laser radiation with transparent material.

The present invention is based on the features of the interaction of power laser radiation with transparent material and the progress of the computer graphic art. One of its purposes is creation of a method for transformation of both the displayed image represented by incomplete data, and the new image parts added during production, into aggregate of laser-induced damages (etch points) so as the high quality laser-induced image can be produced.

SUMMARY OF THE INVENTION

The present invention has its principal task to provide a method for the production of complicated laser-induced images inside transparent material and more particularly, of the images about which complete information is lacking before production and is only added during production.

One or more embodiments of the invention comprise a method for detachment of the image parts, about which we do not have information, so as the new parts can be produced within a transparent material after the production of the rest parts without internal split of the material.

Another embodiment of the invention is a method for concordance of the space resolution of the new image part with the space resolution of the whole image by smoothing of the average density of laser-induced damages.

One or more embodiments of the invention comprise a method for adaptation of a contour of the new image part to the corresponding detachment line.

One or more embodiments of the invention comprise a method for elimination of objectionable visual effect connected with the increase of laser-induced damages density of the detachment area.

One or more embodiments of the invention comprise a method for smoothing of gray shades along the borders between new image parts and the adjacent areas of the whole images without destruction of gray shade information.

One or more embodiments of the invention comprise a method for concordance of the new image layers with the layers of the whole image.

One or more embodiments of the invention comprise a method for simultaneous processing and production of the new image parts and an original image, represented by incomplete data.

DESCRIPTION OF THE DRAWINGS

FIG. 15 shows the border of the portrait of FIG. 13.

FIG. 16 shows the detachment line, which is modified from the border of FIG. 14.

FIG. 17 shows the rings and their parts, which enter in the area confined by the detachment line.

FIG. 27 shows the area of the sculpture in which the portrait should be entered.

FIG. 28 shows the border of the area of the FIG. 27.

FIG. 29 shows the border of the area of 3D portrait of FIG. 23.

FIG. 30 shows the detachment line modified from the border of FIG. 28, the border of the portrait of FIG. 23 and the controlling line.

DETAILED DESCRIPTION OF THE INVENTION

The invention comprises the method for production of laser-induced images inside optically transparent materials. In general, the invention relates to methods, in which laser energy is utilized to generate complicated laser-induced images and particularly, the images, about which complete information becomes available only during their production.

The quality of laser-induced images and speed of their production depend on the laser system and the computer graphic system, and particularly, on the processing of the displayed images for the purpose of their modification into the aggregate of points, at which laser radiation should be focused. It is important, that all Patents mentioned above examine situation, when image processing is made before production and the image processing time is not limited practically. For this situation the time, needed for modification of the displayed image into the point arrangement, which can be produced by the laser inside transparent material, is not very important and all attention can be directed to the production speed of the laser system.

Just so the task is decided in U.S. patent application Ser. No. 10/075,018, Ser. No. 09/354,236 to Troitski, and patent application Ser. No. 10/078,099 to Troitski et al. For example, U.S. patent application Ser. No. 09/354,236 to Troitski and U.S. patent application Ser. No. 10/078,099 to Troitski et al. disclosing methods for creating of different point arrangement do not take into account the time problem of the image processing. The exclusion is U.S. Pat. No. 6,087,617 to Troitski et al., which discloses the method for production acceleration by decreasing the number of etch points. However, it is clear, that such acceleration of the process production leads to the reduction of image resolution and consequently, to the reduction of image quality.

The present invention discloses the method for rapid production of high quality complicated laser-induced images and, particularly, for the situation, when only separate parts of the images are known before production but the information about the rest their parts becomes available only during the production process. We give three examples illustrated the situation.

EXAMPLE 1

Figure 1:
FIG. 1 shows the image, in which the face can be replaced during production.

Let us imagine, that the laser system is used for production of the 2D laser-induced portrait at the presence of the customer and the customer wants that his portrait would be produced instead of the face of 2D image (FIG. 1). In this case the image without face (FIG. 4) can be produced before and only the portrait should be entered during production. So the task is to insert the etch points of a portrait into aggregate of etch points describing the image of FIG. 4.

EXAMPLE 2

Figure 2:
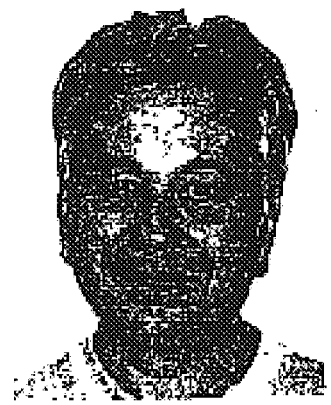
FIG. 2 shows the face, should be entered instead of the original face.

Let us imagine the same situation of the example 1, but the customer whishes that his portrait is located on the front surface of a golf ball placed on a tee (FIG. 2). In this case, the tee and the general part of the ball are known beforehand and can be produce in advance. The task is to process the portrait and to transform the displayed portrait into the aggregate of the laser-induced damages so as the portrait can be entered into the whole image of golf-ball.

EXAMPLE 3

Figure 3:
FIG. 3 shows the fragment of the original image covered by points, which correspond to laser-induced damages inside transparent material.

Let us imagine, that the laser system is used for production of the 3D laser-induced portrait (sculpture) at the presence of the customer and the customer wants that his face would be built in the head of a man in the hat (FIG. 3). The shape of the hat and the general head shape are known before and only face should be changed during production. This permits: 1) to produce 3D portrait for very short time and 2) to use only one 3D camera instead of three 3D cameras necessary for creation of the whole sculpture.

Examining the examples, we see that it is necessary to develop methods, which enable to produce the laser-induced images in parts: one group of the parts can be produced in advance, another group of the parts should be produced after receiving additional information and it is important to note that the parts of the second group should be processed preliminarily, before their production, so as the reconstructed image looks effective as the indivisible image and all its etch points arrange the whole image without internal splits. Such entering new image parts in the original laser-induced image demands creation of special methods, which first of all teach transformation of displayed image, represented by incomplete data, into aggregate of etch points so as the borders between new image parts and the whole image are imperceptible.

One or more embodiments of the invention comprise a method for detachment of the image parts, about which we do not have information, so as the new parts can be produced within a transparent material after the production of the rest parts without internal split of the material. For this before the detachment of the said image parts, the whole image is covered by the points, which correspond to laser-induced damages, and detachment line is constructed so way that it keeps the etch points, which are placed in the close-fitting area.

The method for detachment of the image parts consists of the following steps:

Step 1. The image area, information of which should be received during production, is determined.

Step 2. The border of the image area, found in step 1, is determined.

Step 3. The whole image is covered by points, which correspond to laser-induced damages inside the transparent material.

Step 4. The detachment line is formed from the border, determined in step 2, so as the detachment line is closer to the border, contains the part of etch points and all etch points, which do not belong to the detachment line, are remote from the line on the distance more than $d_0$ ($d_0$ is the minimal distance between adjacent etch points when the internal split is not arisen).

Step 5. The points of covering of the image area placed inside the detachment line are removed.

It is known that the space resolution of the laser-induced images are determined by the average etch point density ("Experience of creation of laser-induced damage images", Troitski, Proc. of SPIE Vol. 3902 (2000), 479–488). The new 3D image part, having the same detachment lines as corresponding removed part, can have surface, the square of which differs from previous part. Therefore if we preserve the previous covering by the etch points we produce new image part with space resolution differing from space resolution of the whole image.

Another embodiment of the invention is a method for concordance of the space resolution of the new image part with the space resolution of the whole image by smoothing of the average density of laser-induced damages. This method consists of the following steps:

Step 1. The space resolution of the whole image, realized in the transparent material, is determined.

Step 2. The average etch point density, corresponding to the space resolution, found on the step 1, is determined.

Step 3. The numbers of points, which should cover the new image part is determined so as the average point density of the new part is approximately equal to the average etch point density found in step 2.

Step 4. The new image part is covered by points, so as
  the total number of points of each part is equal to the corresponding number of points found in step 3;
  the distance between adjacent etch points is not smaller than $d_0$;
  the boundary points of each new image part coincide with the points of corresponding detachment line.

Very often, each new image part has own contour, which differs from the corresponding detachment line. Therefore if the new image part is used instead of the old part, the empty areas appear.

One or more embodiments of the invention comprise a method for adaptation of a contour of the new image part to the corresponding detachment line. First of all it is necessary to find the right scale of the new image part, so as its contour enters inside the corresponding detachment line. After that, it is necessary to determine the additional controlling contour of the new image part, so as the area of the image placed between this contour and the corresponding detachment line can undergo a modification without violation of general information containing in the new image. The area between the controlling contour and the corresponding detachment line is modified so as the controlling contour coincides with the detachment line.

Method for adaptation of the contour of the new image part to the corresponding detachment line is as follows:

Step 1: The scale of the new image part is determined so as its boundary contour enters inside the corresponding detachment line.

Step 2: The additional controlling contour is determined so as the area of the new image part placed between this contour and the corresponding detachment line can undergo a modification without violation of general information containing in the new image.

Step 3: The area of the new image between the controlling contour found in step 1 and the corresponding detachment line is modified so as the controlling contour coincides with the detachment line.

Step 4: The area of the new image part is covered by points so as etch points of the detachment line are strong points of new covering of the new image part.

After coinciding the controlling contour and the corresponding detachment line, in the general case, a derivative of the surface of the new image part does not coincide with a derivative of the surface of the adjacent image area. In a result, even if the etch point density is the same for the whole image, the projections of etch points on the plane perpendicular to the view direction have different density for the new image part and adjacent area of the whole image. This underlines of the detachment line creates objectionable visual effect.

One or more embodiments of the invention comprise a method for elimination of objectionable visual effect connected with the increase of laser-induced damages density of the detachment area. This method consists of the following steps:

Step 1: The controlling contour is determined so as the area of the new image part placed between this contour and the corresponding detachment line can undergo a modification without violation of the surface laying inside the controlling contour.

Step 2: The surface of the image placed between the controlling contour and the corresponding detachment line is modified so as the surface of the general image turns into the surface of the new part of the image fluently.

Step 3: The modified surface is covered by points so as the distance between adjacent etch points is larger than $d_0$, and boundary points of this covering coincide with the etch points of the detachment line.

The objectionable visual effect, concerned with joining of the new image part and the general image, appears if gray shades change along the detachments line. This effect is eliminated by smoothing of gray shades along the borders of new image parts and the adjacent areas of the whole images. However, this smoothing should be produced by the way, which gives a chance to preserve the general gray shade information.

One or more embodiments of the invention comprise a method for smoothing of gray shades along the borders between new image parts and the adjacent areas of the whole images without destruction of gray shade information. The method is based on the fact that usually the producible image has several layers. In this case only the first layer of the new image and the first layer of the whole image have the border, which coincides with the detachment line. The border between the second layer of the new image and the second layer of the whole image enters in the detachment line of the first layer, which in its turn, contains the border between the third layer of the new image and the third layer of the whole image and so on. In other words, this method is based on using several detachment lines, which detach different layers of the laser-induced image by different ways.

This method consists of the following steps:

Step 1. The image area, information of which should be received during production, is determined.

Step 2. The border of the image area, found in step 1, is determined.

Step 3. The whole image is covered by points, which correspond to laser-induced damages placed inside the transparent material, so as these points, belonging different layers, transfer the right space resolution of the whole image.

Step 4. The first detachment line is formed from the border, determined in step 2, so as the detachment line is closer to the border, contains the part of etch points of the first image layer and all residuary etch points of the first layer are remote from the line on the distance more than $d_0$ ($d_0$ is the minimal distance between adjacent etch points, when the internal split is not arisen).

Step 5. The second detachment line is formed so that it enters in the detachment line and does not contains the points of the first detachment line but contains the points nearest to the first detachment line.

Step 6. The corresponding detachment lines are formed for each layer so as the detachment line of each next layer enters in the detachment line of corresponding previous layer.

Step 7. The points of each layer placed inside the corresponding detachment line are removed.

EXAMPLE 4

Figure 4:
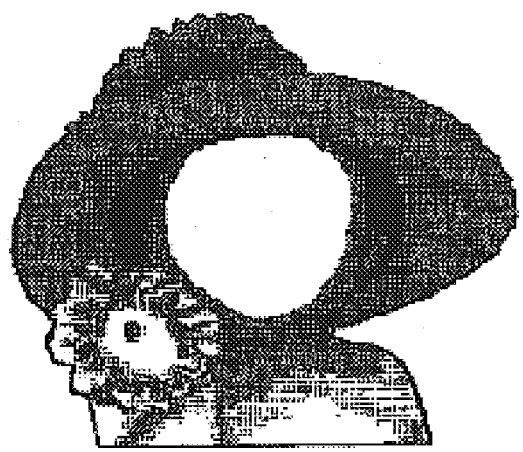
FIG. 4 shows the face area, inside of which points of the original image are removed.
Figures 5, 6:
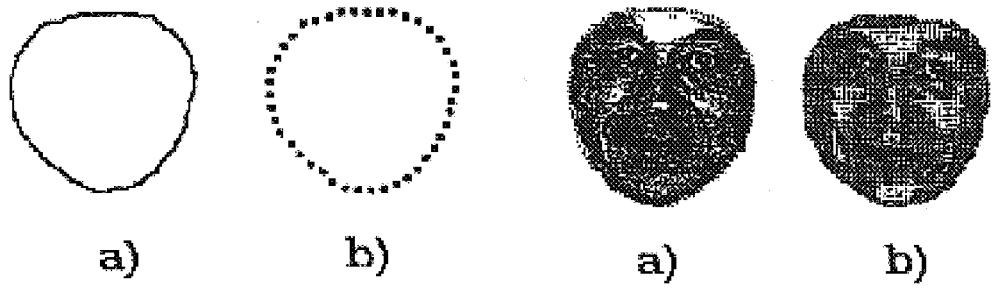
FIG. 5a) shows the line of the border determining the face area, which should be changed.
FIG. 5b) shows the detachment line modified from the line of the border.
FIG. 6a) shows the image, which is picked out from portrait of FIG. 2 by the contour of FIG. 5a).
FIG. 6b) shows the part of the face, which is transformed into the aggregate of points.
Figure 7:
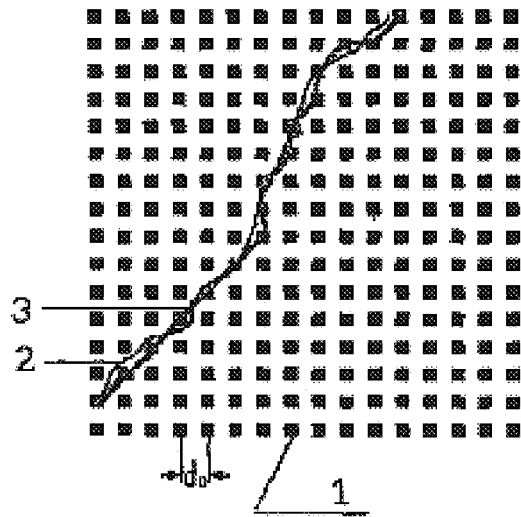
FIG. 7 shows the modification of the border to the detachment line: 1—is one of the points, corresponding to laser-induced damages; 2—is the line of the border; 3—is the detachment line; $d_0$ is the minimal distance between adjacent points.
Figure 8:
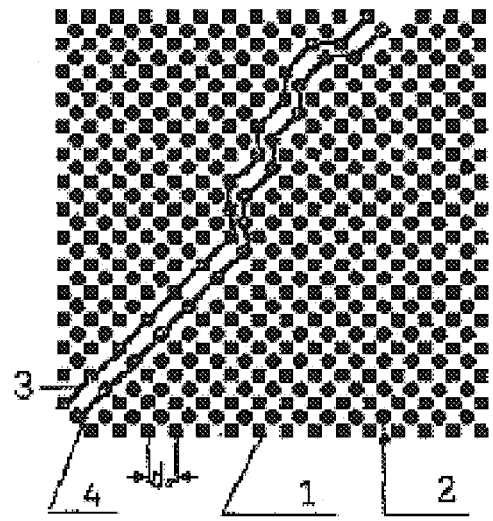
FIG. 8 shows two detachment lines corresponding to different layers: 1—is one of the points (squares) corresponding to laser-induced damages of the first layer, 2—is one of the points (circles) corresponding to laser-induced damages of the second layer; 3—is the detachment line of the first layer; 3—is the detachment line of the second layer, $d_0$ is the minimal distance between adjacent points.
Figure 9:
FIG. 9 shows fragment of the whole image arranged from the points of the original image and the points of the new image part.
Figure 10:
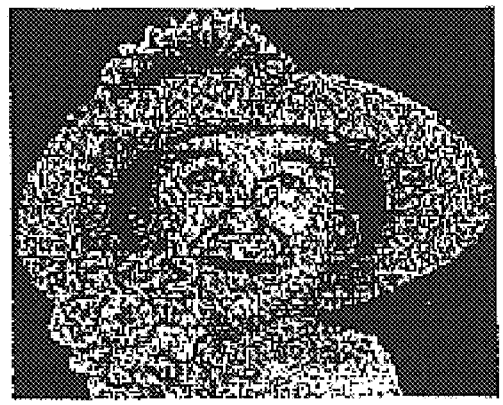
FIG. 10 is the fragment of the image produced in crystal glass.
Figure 11:
FIG. 11 shows the compound image, produced in the crystal glass.

We illustrate the method for situation described in the example 1. FIG. 1 shows the standard image, in which the face can be replaced during production. FIG. 2 shows the face, which should be entered instead of the original face. FIG. 3 shows the fragment of the original image covered by points, which correspond to laser-induced damages inside transparent material. FIG. 4 shows the face area, inside of which points of the original image are removed. This is also the area, in which the points of the new face should be placed. FIG. 5a) shows the line of the border determining the face area, which should be changed. FIG. 7 shows the face fragment of FIG. 3 and illustrates modification of the borderline (line 2) to the detachment line (line 3), which is closer to the border. The detachment line (in contrast to the line of the border) contains the etch points, which are closer to the border. FIG. 5b) shows the result of the modification of the border into the detachment line, which consists of the points corresponding to the laser-induced damages. FIG. 6a) shows the image, which is picked out from portrait of FIG. 2 by the contour of FIG. 5a). FIG. 6b) shows the part of the face, which is transformed into the aggregate of points. The covering of FIG. 6b) consists of the points so as the minimal distance between adjacent points is $d_0$ and the border points coincide with points of the detachment line. FIG. 8 shows two detachment lines corresponding to different layers. These lines are placed one after another and so as the first detachment line contains the points of the first layer and the second detachment line contains the points of the second layer. FIG. 9 shows fragment of the whole image arranged from the points of the original image and from the points of the new image part (FIG. 6b). FIG. 11 shows the compound image, produced in a lead crystal. FIG. 10 is the fragment of the FIG. 11. The laser-induced damages of FIG. 10 correspond to the points of FIG. 9.

In a result of using several detachment lines, the borders between new image parts and the whole image are absolutely imperceptible only for 2D images. For general case-production of 3D images, in a result of surface contortion, aggregate of etch points of the new image layer does not agree with the same number of layer of whole image.

One or more embodiments of the invention comprise a method for concordance of the new image layers with the layers of the whole image. The method teaches that the layer of the new image part is selected so as its points and points of the corresponding layer of the whole image arrange united ensemble. For realization of the method, it is necessary, to modify the number of layers both original image and the-new image parts. The change of the sequence of the layers should be produced when in a result of the curvature of the 3D image surface, the distance between the surface and a plan is changed more than $d_0$. In other words, the covering of the image by multilevel coating is produced by using of the logical alteration of the layer number so as the laser-induced damages located on the same distance from the image front, were situated in the junctions of the equidistance grating. Laser-induced image of high space resolution is produced by four layers. In detail, we disclose the method for this case and for example 2, described above.

This method consists of the following steps:

Step 1: The whole golf-ball image is covered by points, which correspond to laser-induced damages and which describe the drawing of the golf-ball surface. To transfer the demanded space resolution, the covering has four levels, so as the next level enters in the previous level. The distance between the adjacent levels is $d_0$ ($d_0$ is the minimal distance between adjacent etch points, when the internal split is not arisen).

Figure 12:
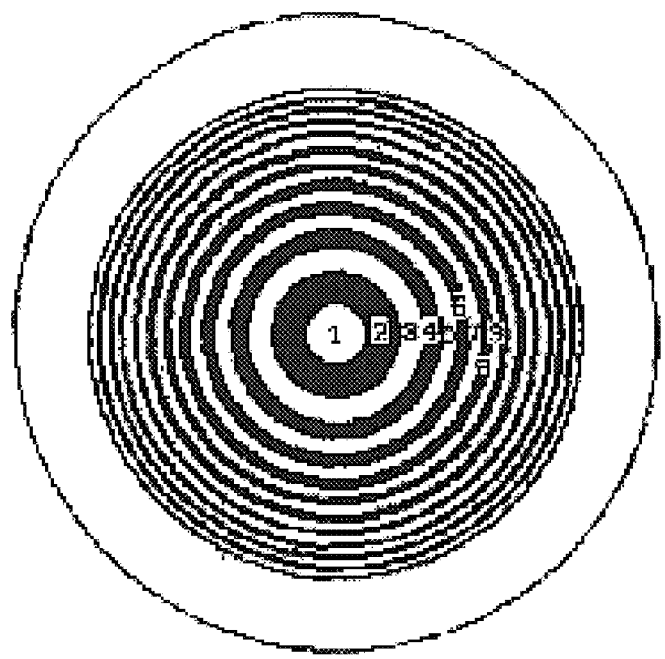
FIG. 12 shows the projections of the flat images (rings) into plane XY, which is perpendicular to the view direction. These rings are section of whole golf-ball image by several planes.

Step 2: The whole golf-ball image is divided by planes, which are perpendicular to the view direction into several flat images (rings) so as the distance between adjacent flat images is equal to $d_0$. FIG. 12 shows the projections of the flat images (rings) into plane XY, which is perpendicular to the view direction.

Step 3: The points of all forth levels are projected in the flat images (circles) so that every circle has four levels. Coordinates of each point (pixel) in plan XY perpendicular to the view direction correspond to the number of the pixels from the (0,0) so that the first level contains points with even X and even Y coordinates; the second level contains points with odd X and odd Y coordinates; the third level contains points with even X and odd Y coordinates; the first level contains points with odd X and even Y coordinates.

Figure 13:
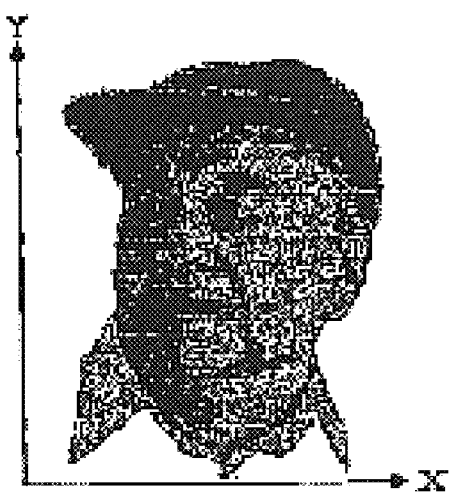
FIG. 13 shows the portrait, which should be placed on the surface of the golf-ball.

Step 4: The portrait is processed so that it has minimal number of gray shades and so that it can be entered into golf ball surface image. FIG. 13 shows the portrait.

Figure 14:
FIG. 14 shows the portrait transformed into the aggregate of points.

Step 5: The displayed image processed in step 4 is transformed into arrangement of points, which belong four layers: the points of the first layer have even X and even Y coordinates, the points of the second layer have odd X and odd Y coordinates; the points of the third layer have even X and odd Y coordinates; the points of the forth layer have even X and even Y coordinates. FIG. 14 shows the portrait.

Step 6: The portrait border of FIG. 13 is determined. FIG. 15 shows the border.

Step 7: The detachment line is modified from the border, as the line, which is closer to the border and which contains all potential laser-induced damages, distances of which from the border are smaller than $d_0$. FIG. 16 shows the detachment line.

Step 8: The detachment line is laid on the projections of the flat images (circles) into plane XY (FIG. 16). FIG. 17 shows the result of the procedure.

Figure 18:
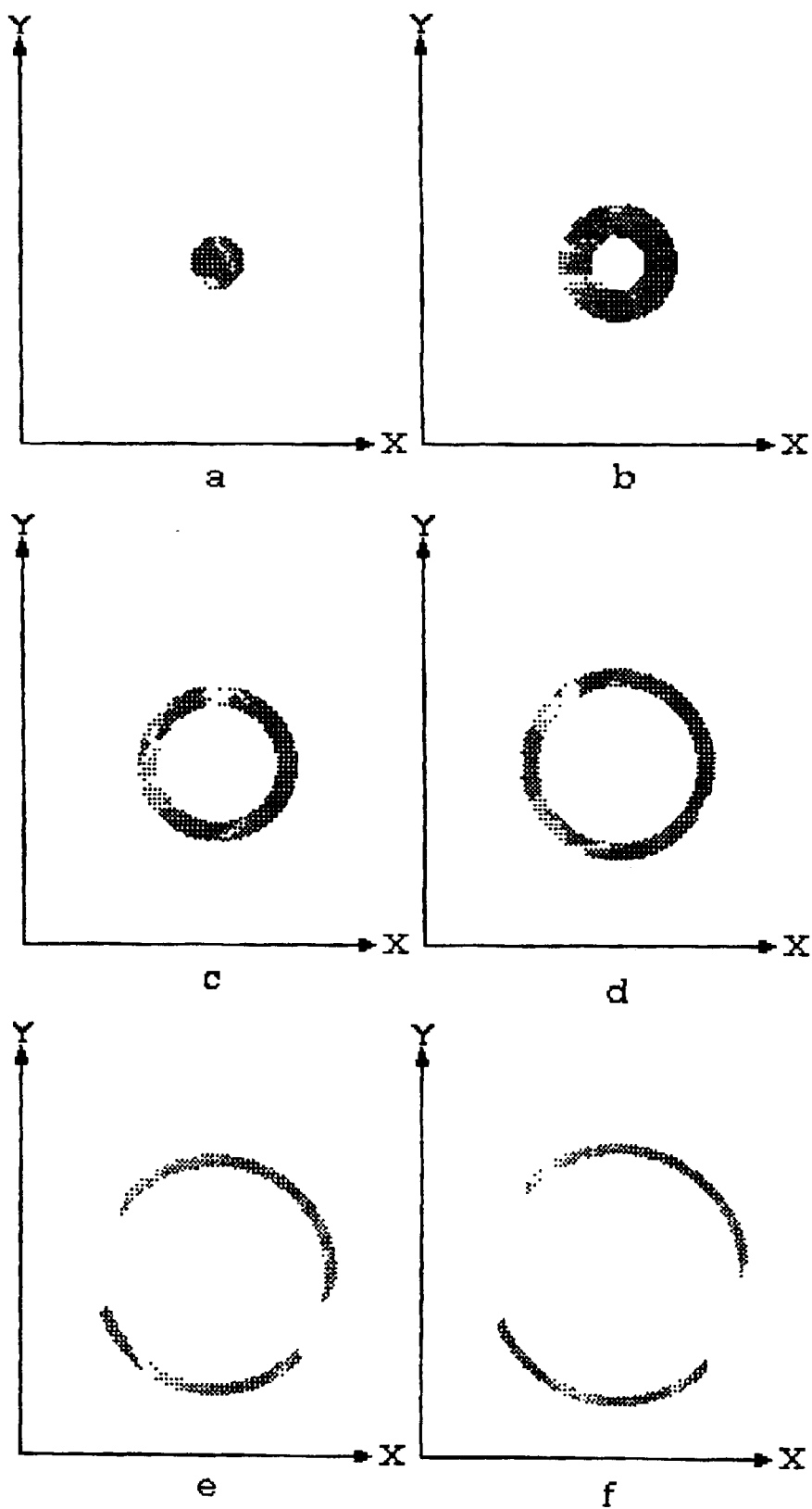
FIG. 18 shows the aggregate of points corresponding to several rings of FIG. 17: a)—ring 1, b)—ring 2, c)—ring 3, d)—ring 4, e)—ring 6, f)—ring 7.

Step 9: The aggregates of points are determined for all said circles (or their parts) by laying the circles (or their parts) on the aggregate of the portrait points (FIG. 14). FIG. 18 shows the point aggregates for circles 1,2,3,3,6, and 7.

Step 10: The sequence of the production of the laser-induced damages belonged to different layers is determined so as the points of the same plane are the united ensemble. For this case we have: the etch points of the first layer of the second circle produced together with the etch points of the second layer of the first circle; the etch points of the first layer of the third circle produced together with the etch points of the second layer of the second circle and together with points of the third layer of the first circle, and so on.

Figure 19:
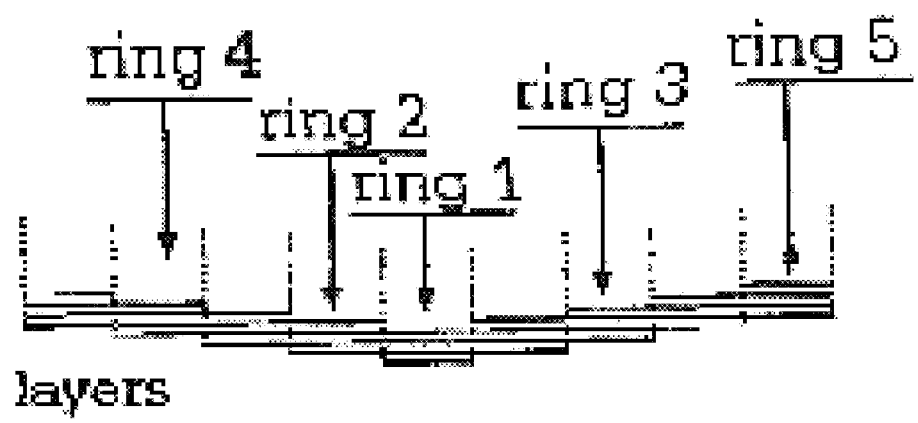
FIG. 19 shows the sequence of layers for production of laser-induced damage portrait.
Figure 20:
FIG. 20 shows the portrait on surface of golf-ball, produce inside the crystal glass.

FIG. 19 shows the diagram, illustrated the sequence. FIG. 20 shows the image produced in a lead crystal.

EXAMPLE 5

Figure 21:
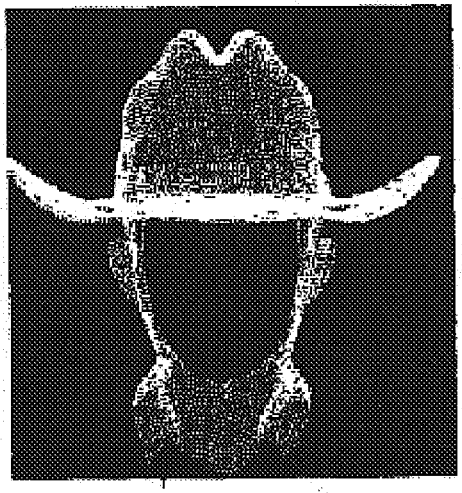
FIG. 21 shows the front of the head sculpture in which any wishful face can be entered. The points covering this sculpture correspond to the laser-induced damages, which should be produced inside transparent material.
Figure 22:
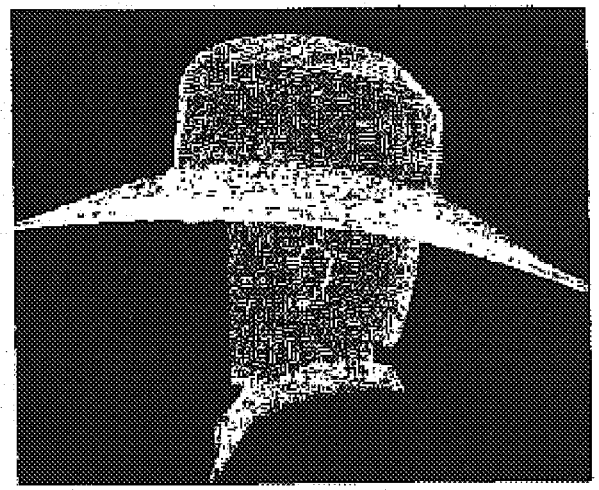
FIG. 22 shows the side of the sculpture of FIG. 21.
Figure 23:
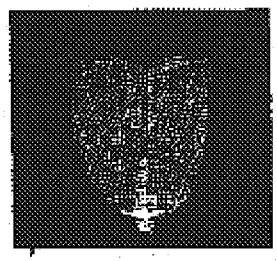
FIG. 23 shows the front of 3D portrait, which should be entered into the sculpture of FIG. 21.
Figure 24:
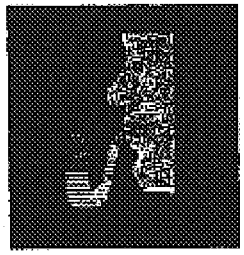
FIG. 24 shows the side of 3D portrait, which should be entered into the sculpture of FIG. 21.
Figure 25:
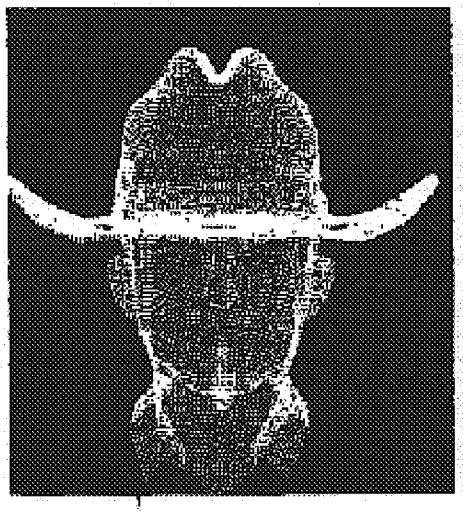
FIG. 25 shows the front of 3D sculpture after entering of the 3D portrait of FIG. 23 into the sculpture of FIG. 21.
Figure 26:
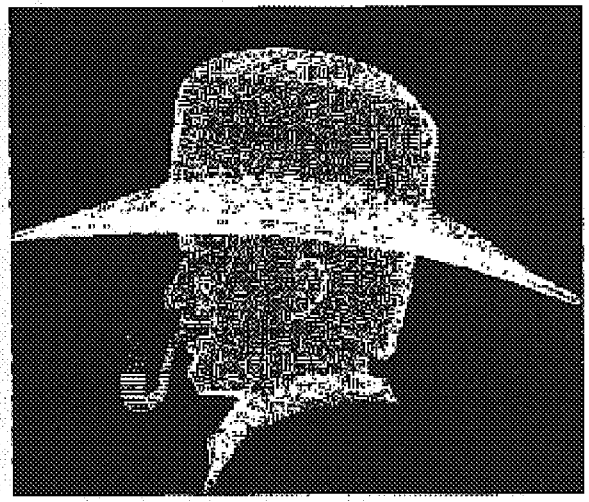
FIG. 26 shows the side of 3D sculpture after entering of the 3D portrait of FIG. 23 into the sculpture of FIG. 21.

We illustrate the method disclosed above for situation described in the example 3. FIG. 21 shows the front of the 3D head sculpture in which any wishful face can be entered. The points covering this sculpture correspond to the laser-induced damages, which should be produced inside transparent material. FIG. 22 shows the side of the sculpture of FIG. 21. FIG. 23 shows the front of 3D portrait, which should be entered into the sculpture of FIG. 21. FIG. 24 shows the side of 3D portrait, which should be entered into the sculpture of FIG. 21. FIG. 25 shows the front of 3D sculpture after entering of the 3D portrait of FIG. 23 into the sculpture of FIG. 21. FIG. 26 shows the side of 3D sculpture after entering of the 3D portrait of FIG. 23 into the sculpture of FIG. 21. FIG. 27 shows the area of the sculpture in which the portrait should be entered. FIG. 28 shows the border of the area of the FIG. 27. FIG. 29 shows the border of the area of 3D portrait of FIG. 23. FIG. 30 shows the detachment line modified from the border of FIG. 28, the border of the portrait of FIG. 23 and the controlling line.

Figure 31:
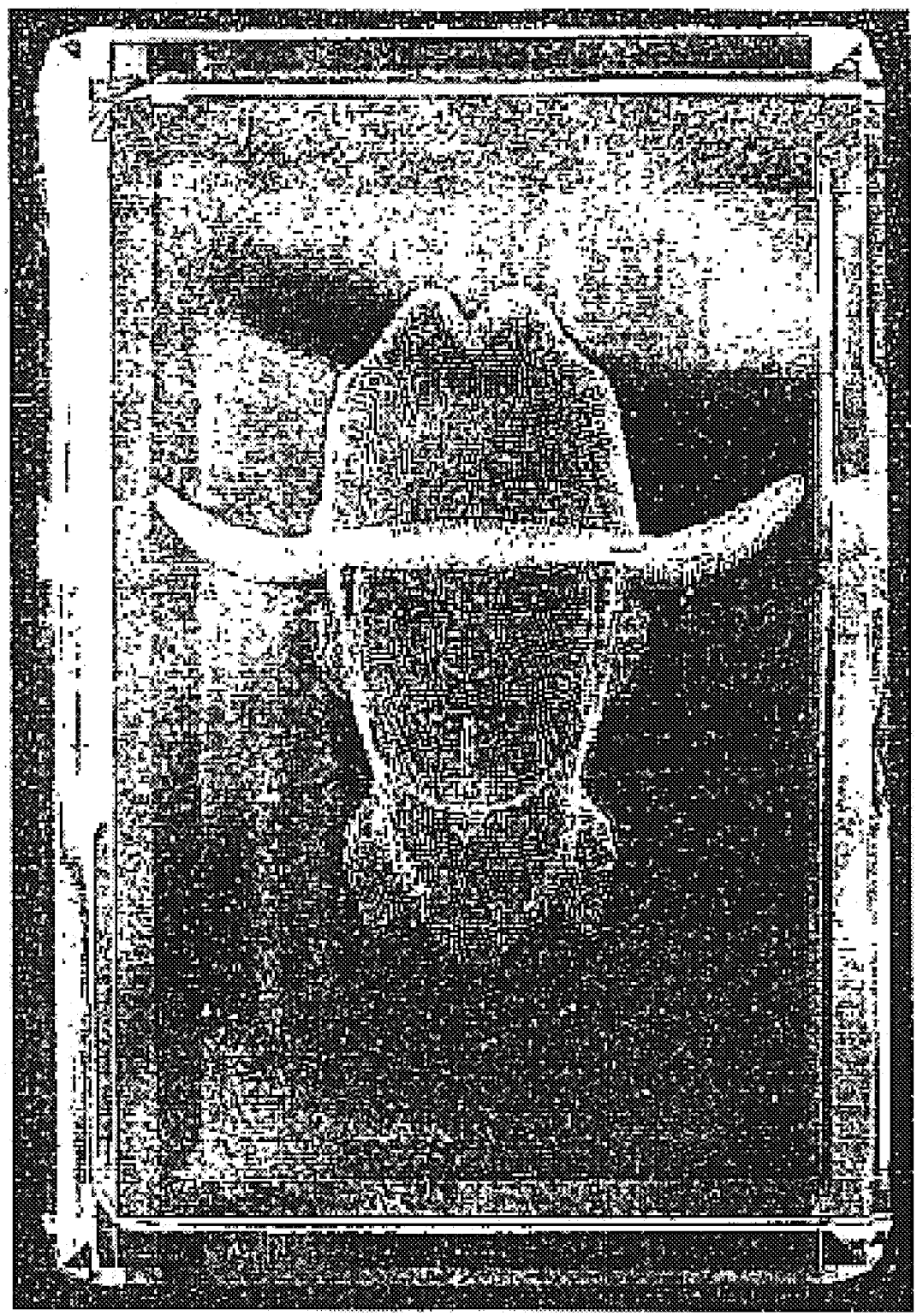
FIG. 31 shows the synthesized head sculpture produced in crystal glass.

The points of FIGS. 25 (front view) and 26 (side view) covering the synthesized head sculpture correspond to the laser-induced damages, which should be created within transparent material to produce the laser-induced image. FIG. 31 shows the image produced inside an optically polished cube of high-index lead oxide glass by focusing laser radiation at points corresponding to FIGS. 25 and 26. Laser energy value of each point increases the breakdown threshold.

The method disclosed above gives a chance to enter the new image parts inside the image, which has been processed before their production or which has been produced within transparent material before receiving information about said parts. In this case it is very important to enter the new image parts so as their aggregate of laser-induced damages harmonizes with the aggregate of laser-induced damages which have already produced.

One or more embodiments of the invention comprise a method for simultaneous processing and production of the new image parts and of the whole original image. The method consists of the following steps:

Step 1: The image areas in which the image parts should be removed are determined.

Step 2: The borders of the image areas found in step 1 are determined

Step 3. The new image parts are received.

Step 4: The scales of the new image parts are determined so as their boundaries enter inside the corresponding image areas. The all new image parts are entered inside the corresponding image areas.

Step 5: The additional controlling contour for each new image part is determined so as the area of the new image part placed between this contour and the corresponding boundary line can undergo a modification without violation of general information containing in the new image.

Step 6: The area of each new image between the said controlling contour and the corresponding boundary is modified so as the controlling contour coincides with the boundary.

Step 7: The surface of each 3D new image part placed between the controlling contour and the corresponding boundary is modified so as the surface of the general image turns into the surface of the new image part fluently.

Step 8: The gray shades of the image area for each new image part placed between the controlling contour and the corresponding boundary is modified so as the gray shades of the general image turns into the gray shades of the new image part fluently.

Step 9: The several (more than one) the reconstructed 3D image are created so as they are similar one to another, have different scale, one image is enclosed in another and distance between adjacent 3D images is not smaller than $d_0$.

Step 10: The said images are covered by points, which correspond to laser-induced damages placed inside the transparent material, so as all points of all enclosed images transfer the right space resolution of the original image, and the distance between adjacent points of the same image is not smaller than $d_0$.

Step 11: The laser radiation is focused at each point of the covering of all said images, so as the laser-induced damage is generated at the said each point Step 12: The sequence of the production of the laser-induced damages belonged to different enclosed images is determined so as the damages of the one image do not prevent to produce damages of another enclosed image.

Figure 32:
FIG. 32 shows the aggregate of points of the lion image in which a lion face is replaced by a girl face.
Figure 33:
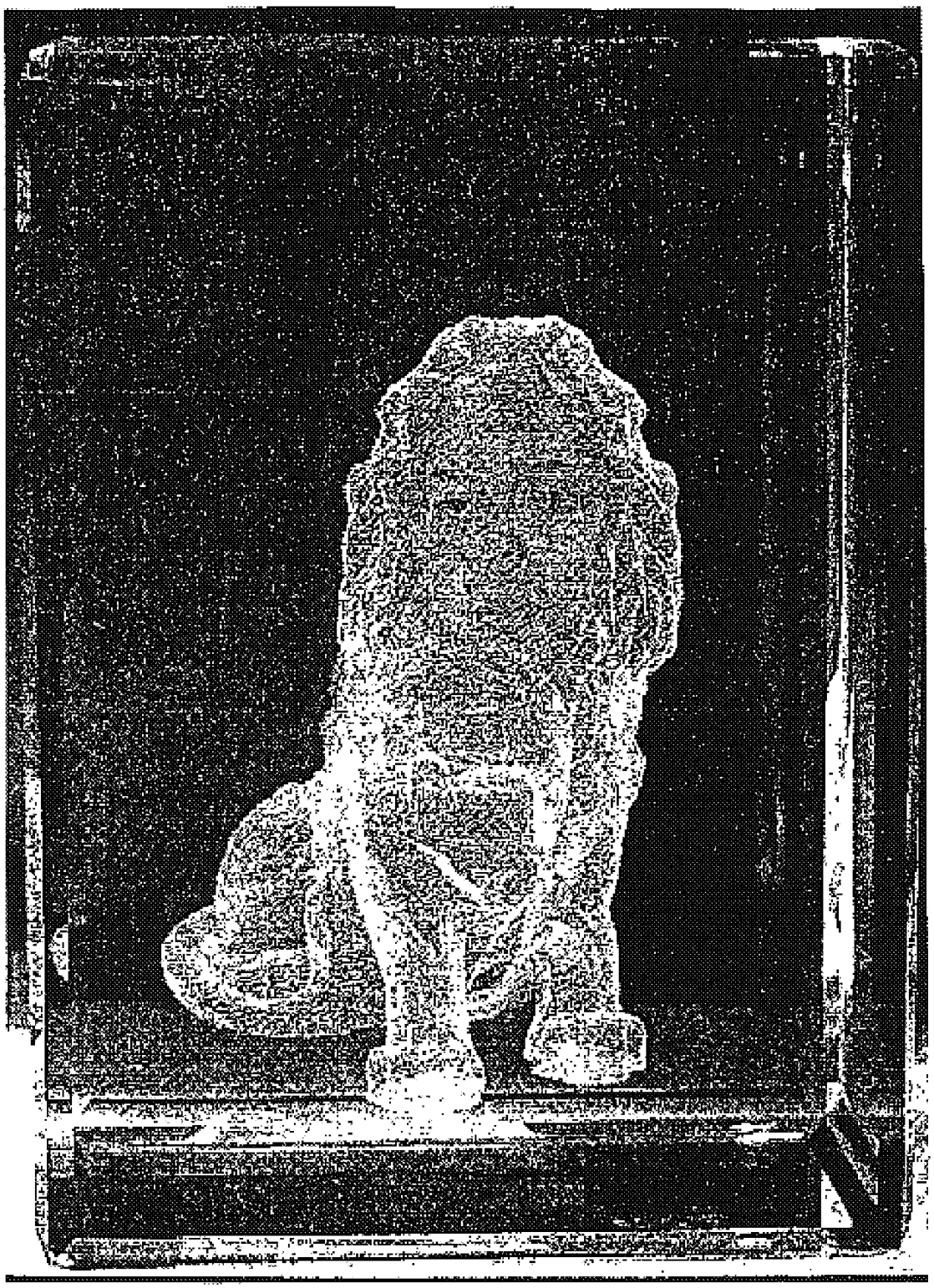
FIG. 33 shows the image produced inside an optically polished cube of high-index lead oxide glass by focusing laser radiation at points corresponding to FIG. 32.

FIG. 32 shows the aggregate of points of the lion image in which a lion face is replaced by a girl face. The image was processed in accordance with the method described above. FIG. 33 shows the image produced inside an optically polished cube of high-index lead oxide glass by focusing laser radiation at points corresponding to FIGS. 32. Laser energy value of each point increases the breakdown threshold.

I claim:

1. A method for production of laser-induced image, represented by incomplete data, which are supplemented during production, comprising:

detachment of the image parts, about which information is lacking;

concordance of the space resolution of the new image parts, information about which is added during production with the space resolution of the whole image;

adaptation of the contour of the new image part to the corresponding detachment line;

elimination of objectionable visual effect connected with the increase of laser-induced damage density of the detachment area;

smoothing of gray shades along the borders between new image parts and the adjacent areas of whole image without destruction of gray shade information;

concordance of the new image layers with the layers of the whole image;

transformation of displayed image into aggregate of points, which correspond to laser-induced damages produced inside transparent material so as the new image parts can be entered;

receiving required information and synthesis of the new image parts so as they can be transferred into the arrangement of points corresponding to laser-induced damages, which arrange united ensemble with the whole image;

forming of the arrangement of points in which laser radiation should be focused to create the image with desired space resolution without internal split;

generation of the required laser radiation and focusing of the laser beam at each predetermined points of the transparent material.

2. A method in accordance with claim 1 wherein detachment of the image parts, about which information is lacking, comprises:
- determination of the image area, information of which should be received during production;
- determination of the border of the image area, information of which should be received during production;
- covering of the whole image by points, which correspond to laser-induced damages inside the transparent material;
- formation of the detachment line from the said border so as the detachment line is closer to the border, contains the part of etch points and all etch points, which do not belong to the detachment line, are remote from the line on the distance more than $d_0$ ($d_0$ is the minimal distance between adjacent etch points when the internal split is not arisen);
- moving away the points of covering of the image area placed inside the detachment line.

3. A method in accordance with claim 1 wherein the concordance of the space resolution of the new image part with the space resolution of the whole image by smoothing of the average density of laser-induced damages, comprises:
- determination of the space resolution of the whole image, realized in the transparent material;
- determination of the average etch point density, corresponding to the said space resolution;
- determination of the numbers of points, which should cover the new image part so as the average point density of the new part is approximately equal to the said average etch point density;
- covering of the new image part by points, so as:
  - the total number of points of each part is equal to the said number of points;
  - the distance between adjacent etch points is not smaller than $d_0$;
  - the boundary points of each new image part coincide with the points of the corresponding detachment line.

4. A method in accordance with claim 1 wherein adaptation of a contour of the new image part to the corresponding detachment line, comprises:
- determination of the scale of the new image part so as its boundary contour enters inside the corresponding detachment line;
- formation of the additional controlling contour so as the area of the new image part placed between this contour and the corresponding detachment line can undergo a modification without violation of general information containing in the new image;
- modification of the new image area, which is between the said controlling contour and the corresponding detachment line so as the controlling contour coincides with the detachment line covering by points of the new image area so as etch points of the detachment line are strong points of new covering of the new image part.

5. A method in accordance with claim 1 wherein elimination of objectionable visual effect connected with the increase of laser-induced damages density of the detachment area comprises:
- formation of the controlling contour so as the area of the new image part placed between this contour and the corresponding detachment line can undergo a modification without violation of the surface laying inside the controlling contour;
- modification of the surface of the image placed between the controlling contour and the corresponding detachment line so as the surface of the general image turns into the surface of the new part of the image fluently;
- covering of the said modified surface by points so as the distance between adjacent etch points is larger than $d_0$, and boundary points of this covering coincide with the etch points of the detachment line.

6. A method in accordance with claim 1 wherein a method for smoothing of gray shades along the borders between new image parts and the adjacent areas of the whole images without destruction of gray shade information, comprises:
- determination of the image area, information of which should be added during production;
- delimitation of the border of the said image area;
- covering of the whole image by points, which correspond to laser-induced damages placed inside the transparent material, so as the said points of all layers give the right space resolution of the whole image;
- formation of the first detachment line so as the said line is closer to the border, contains the part of the etch points of the first image layer, and all residuary etch points of the first layer are remote from the said line on the distance more than $d_0$;
- formation of the second detachment so as it enters in the first detachment line and does not contains the points of the first detachment line but contains the points nearest to the fist detachment line;
- formation of the corresponding detachment lines for each layer so as the detachment line of each next layer enters in the detachment line of corresponding previous layer;
- moving away the points of each layer placed inside the corresponding detachment line.

7. A method in accordance with claim 1 wherein the new image layers are harmonized with the layers of the whole image by using of the logical alteration of the layer number so as the laser-induced damages located on the same distance from the image front, were situated in the junctions of the equidistance grating.

8. A method for simultaneous processing and production of the new image parts and an original image, represented by incomplete data, comprising:
- Step 1: the image areas in which the image parts should be removed are determined
- Step 2: the borders of the image areas found in step 1 are determined,
- Step 3. information of the new image parts is received
- Step 4: the scales of the new image parts are determined so as their boundaries enter inside the corresponding image areas
- Step 5: the additional controlling contour for each new image part is determined so as the area of the new image part placed between this contour and the corresponding boundary line can undergo a modification without violation of general information containing in the new image
- Step 6: the area of each new image between the said controlling contour and the corresponding boundary is modified so as the controlling contour coincides with the boundary
- Step 7: the surface of each 3D new image part placed between the controlling contour and the corresponding boundary is modified so as the surface of the general image turns into the surface of the new image part fluently
- Step 8: the gray shades of the image area for each new image part placed between the controlling contour and the corresponding boundary is modified so as the gray shades of the general image turns into the gray shades of the new image part fluently Step 9: the several (more than one) the reconstructed 3D image are created so as they are similar one to another, have different scale, one image is enclosed in another and distances between adjacent 3D images are not smaller than $d_0$ ($d_0$ is the minimal distance between adjacent etch points when the internal split is not arisen)

Step 10: the said images are covered by points, which correspond to laser-induced damages placed inside the transparent material, so as all points of all enclosed images transfer the right space resolution of the original image, and the distance between adjacent points of the same image is not smaller than $d_0$ Step 11: the laser radiation is focused at each point of the covering of all said images, so as the laser-induced damage is generated at the said each point Step 12: the sequence of the production of the laser-induced damages belonged to different enclosed images is determined so as the damages of the one image do not prevent to produce damages of another enclosed image.

9. A method in accordance with claim 8 wherein 3D laser-induced portrait placed instead of a real face of 3D image produced inside a transparent material.

* * * * *